(12) United States Patent
Fox et al.

(10) Patent No.: US 6,181,383 B1
(45) Date of Patent: Jan. 30, 2001

(54) METHOD AND APPARATUS FOR PRESERVING SYNCHRONIZATION OF AUDIO AND VIDEO PRESENTATION WHEN SPLICING TRANSPORT STREAMS

(75) Inventors: Edward C. Fox, Cranbury; Paul Wallace Lyons, New Egypt; Charles Wine, Princeton, all of NJ (US)

(73) Assignee: Sarnoff Corporation, Princeton, NJ (US)

( * ) Notice: Under 35 U.S.C. 154(b), the term of this patent shall be extended for 0 days.

(21) Appl. No.: 08/864,321

(22) Filed: May 28, 1997

Related U.S. Application Data
(60) Provisional application No. 60/018,554, filed on May 29, 1996.

(51) Int. Cl.[7] ................................................ H04N 9/475
(52) U.S. Cl. .................. 348/515; 348/500; 348/423; 348/845.3
(58) Field of Search .................................. 348/515–520, 348/512, 500, 584, 423, 426, 845.3; 386/39, 96, 98, 99, 104–106; 370/537, 535, 474; H04N 9/475, 7/08, 5/04

(56) References Cited

U.S. PATENT DOCUMENTS

| | | | |
|---|---|---|---|
| 4,703,355 | 10/1987 | Cooper | 358/149 |
| 5,351,090 * | 9/1994 | Nakamura | 348/484 |
| 5,351,092 * | 9/1994 | Poimboeuf et al. | 348/512 |
| 5,371,547 | 12/1994 | Siracusa et al. | 348/426 |
| 5,387,943 | 2/1995 | Silver | 348/512 |
| 5,430,485 | 7/1995 | Lankford et al. | 348/423 |
| 5,594,736 * | 1/1997 | Tatsumi et al. | 370/474 |
| 5,598,352 * | 1/1997 | Rosenau et al. | 348/515 |
| 5,642,171 * | 6/1997 | Baumgartner et al. | 348/515 |
| 5,808,722 * | 9/1998 | Suzuki | 352/12 |
| 5,812,201 * | 9/1998 | Yoo | 348/423 |
| 5,815,634 * | 9/1998 | Daum et al. | 386/96 |
| 5,859,660 * | 1/1999 | Perkins et al. | 348/845.3 |
| 5,874,997 * | 2/1999 | Haigh | 348/423 |
| 5,880,788 * | 3/1999 | Bregler | 348/515 |
| 5,889,563 * | 3/1999 | Bramley | 348/515 |
| 5,949,410 * | 9/1999 | Fung | 345/302 |
| 5,982,447 * | 11/1999 | Nakamura | 348/515 |

OTHER PUBLICATIONS

Proposed SMPTE Standard for Television–13 10–Bit 4:2:2 Component and 4fsc Composite Digital Signals—Serial Digital Interface, SMPTE 259M, SMPTE Journal, Aug. 1995, pp. 562–565.

* cited by examiner

Primary Examiner—John K. Peng
Assistant Examiner—Jean W. Désir
(74) Attorney, Agent, or Firm—William J. Burke

(57) ABSTRACT

A method and apparatus for preserving audio and video presentation synchronization during the splicing operation by selectively deleting, if necessary, an audio/video access unit to avoid overlapping of audio/video frames in the spliced output stream.

19 Claims, 5 Drawing Sheets

METHOD AND APPARATUS FOR PRESERVING SYNCHRONIZATION OF AUDIO AND VIDEO PRESENTATION WHEN SPLICING TRANSPORT STREAMS

This application claims the benefit of U.S. Provisional Application No. 60/018,554 filed May 29, 1996.

This invention was made with U.S. government support under contract number 70NANB5H1174. The U.S. government has certain rights in this invention.

The present invention relates to an apparatus and concomitant method for preserving audio and video presentation synchronization when splicing data streams, e.g., transport streams, from one or more sources. More particularly, this invention relates to a method and apparatus that preserves audio and video presentation synchronization during the splicing operation by selectively deleting, if necessary, an audio/video access unit to avoid overlapping of audio/video frames in the spliced output stream.

BACKGROUND OF THE INVENTION

The proliferation of digital information has created a new television industry employing the concept of a "digital studio", e.g., the HDTV (High Definition Television) or SDTV (Standard Definition television) broadcast studio. A digital studio is an environment or system having numerous components where various sources of digital information can be selectively accessed, manipulated and delivered (in real time or in delay mode) to multiple clients.

Currently, a digital studio is required to produce an output data stream that meets the specifications set forth in the ATSC (Advanced Television Systems Committee) Digital Television Standard and the MPEG-2 systems level standards as set forth in ISO/IEC 13818-1 recommendation H.222.0. The digital studio is required to dynamically switch between various program sources and to produce a compliant output stream. Program sources include, but are not limited to, file servers, tape players, encoders, satellite links, networks and other sources capable of digital storage or transmission, where these sources may contain either prerecorded or "live" data streams. The digital studio may incorporate a switcher, e.g., a Play-To-Air Switcher, to switch, multiplex or splice the various data streams into a single output stream.

Typically, each data stream, when in transport format, carries a plurality of audio and video data streams (substreams), e.g., MPEG system layers define Packetized Elementary Streams (PES) which may carry encoded audio and video streams. Furthermore, MPEG provides a mechanism for time stamping the individual elementary stream components of a program with Presentation Time Stamps (PTS) in the PES layer for time synchronization between the video and audio components (program components) at the time of origination.

However, the presentation time of the various program components are not synchronous to each other but are synchronized to the system clock, e.g., a 27 MHz reference clock. Specifically, the audio and video presentation units have different durations. An audio presentation unit or frame is fixed at 32 msec, while the video presentation unit or frame varies with video format and is not fixed at 32 msec. Maintaining synchronization between the video signal and the associated audio signal is vital in providing high quality presentations, i.e., "lip sync". Lip sync is the synchronization of audio and video presentation, e.g., the synchronization of a soundtrack consisting of dialogue, music, and effects with the pictures of a program.

This requirement creates a problem when switching from one program to another program during a splicing or switching operation. The video and audio units are typically not aligned in the time domain. Namely, the presentation of a video unit may not coincide exactly with the presentation of an audio unit in the time domain, e.g., the audio signal may continue for a short duration after the display of the associated video signal. Thus, switching encoded data streams, e.g., at either a video or an audio "access unit" (a coded representation of a video or an audio presentation unit) creates a partial access unit in the other associated elementary stream that was not aligned at the switch point, e.g., aligning the video access units of two data streams may cause overlap of their audio access units and vice versa.

To illustrate, if the alignment of the video streams are used to control the switch point such that no video discontinuity occurs, the audio from the stream before the switch point may have an access unit that continues into the next video frame. Upon splicing, the audio access unit from the stream following the switch point may then overlap the audio access unit from the stream prior to the switch point.

However, if one attempts to align both the video and the audio by creating a continuous flow of access units for both video and audio, the audio to video time relationships are disturbed causing them to loose synchronization.

Therefore, a need exists in the art for a method and apparatus for preserving audio/video lip sync when splicing data streams from multiple sources.

SUMMARY OF THE INVENTION

The present invention is a method and apparatus for preserving audio and video presentation synchronization, i.e., lip sync, when splicing data streams from one or more sources. The invention preserves audio/video lip sync during the splicing operation by selectively deleting, if necessary, an audio/video access unit to avoid overlapping of audio/video frames in the spliced output stream.

More specifically, if the splicing operation is premised on the alignment of video streams, then a calculation is made to determine the spacing between audio access units at the splice point. If the spacing indicates an overlap situation, then one of the overlapping audio access units is deleted or dropped from the spliced output stream. In turn, the decoder is specified to mute when no audio access unit is applied, e.g., a gap, or when an incomplete audio access unit is decoded.

If the splicing operation is premised on the alignment of audio streams, then a calculation is made to determine the spacing between video access units at the splice point. If the spacing indicates an overlap situation then one of the overlapping video access units is deleted or dropped from the spliced output stream. In turn, future digital decoders maybe specified to repeat a previous video unit when no video access unit is applied or when an incomplete video access unit is decoded. Since cathode ray tube (CRT) video display devices do not have the equivalent of audio mute and must fly wheel frame synchronization, they may display video with artifacts during display resynchronization.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
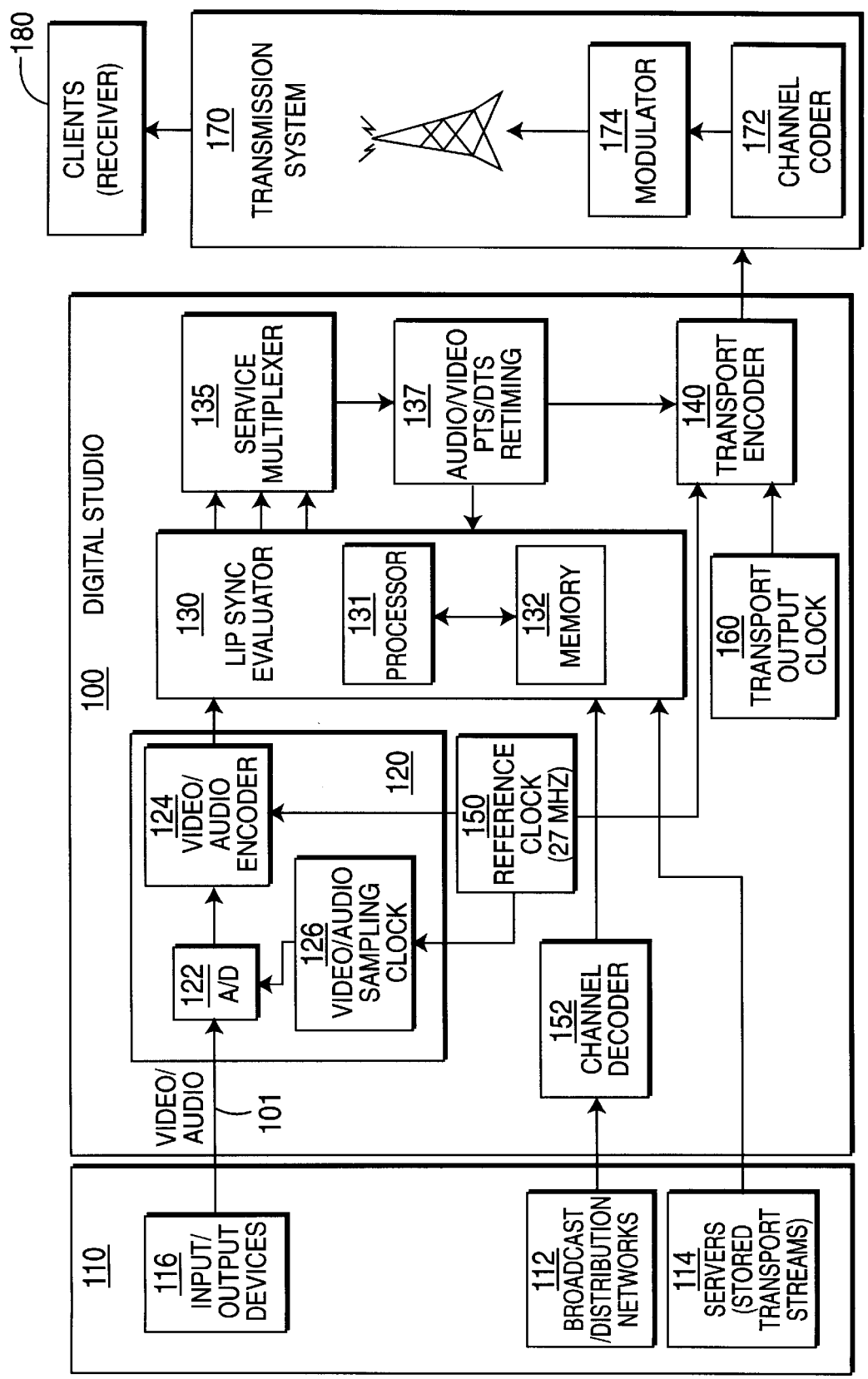
FIG. 1 illustrates a block diagram of a digital studio system employing the present invention.

FIG. 1 illustrates a block diagram of a communication environment having a digital studio 100, a source section 110, a transmission system 170 and a plurality of clients 180. Alternatively, those skilled in the art will realize that the digital studio may comprise the source section 110 (or portion thereof) and the transmission system 170.

Generally, the digital studio serves to distribute various programs to a plurality of clients/receivers 180. In interactive mode, the digital studio 100 permits the clients 180 to selectively request and/or control the various studio resources within source section 110. Each of the clients may include, but is not limited to, a set-top terminal, a receiver, a computer or a storage device. In fact, since it is contemplated that the digital studio will be under distributed control, other studio components may serve as clients as well, e.g., the various program sources within source section 110.

Source section 110 comprises a plurality of program sources, e.g., broadcast/distributing networks or devices 112, servers 114 and various input/output devices 116. More specifically, the broadcast/distribution devices or networks 112 may include, but are not limited to, a satellite distribution network, a broadcast network, a local "live-feed" network or even another digital studio. These devices may generate a transport stream that contains full-motion video, i.e., a sport event with a large quantity of motion and detail.

Although the present invention is described below with reference to transport streams, it should be understood that the present invention can be applied to other bitstream formats, including but not limited to, MPEG program streams or bitstreams in accordance with the asynchronous transfer mode (ATM). Furthermore, although the present invention is described below with reference to a digital studio, it should be understood that the present invention can be adapted to other devices, e.g., playback devices such as a receiver or a video player.

Similarly, the servers 114 may include, but are not limited to, file servers holding a plurality of film and video sources, e.g., a movie (24 frames/second), a video (30 frames/second) of a lecturer or a video of a commercial. In turn, the input/output devices 116 may include, but are not limited to, monitors, various filters, transcoders, converters, codecs, cameras, recorders, interface devices and switchers. Each of the various studio components may incorporate the necessary hardware (e.g., one or more processors, computers or workstation) to store or implement software routines or objects.

In brief, these various program sources generate and/or store transport streams (or data streams in general which are processed by the studio) that are received and multiplexed (splicing operation) by a service multiplexer (splicer) 135 into a single bitstream, e.g., an output stream. This output stream is then encoded and packetized by a transport encoder 140, if not previously in transport format, to produce an output transport stream. A detail discussion of the splicing operation and its effect on audio/video lip sync are further disclosed below with reference to the digital studio 100 and FIGS. 2–4.

In turn, the output transport stream is forwarded to a channel coder 172, where error correction coding is applied. The modulator 174 then modulates the error-coded output transport stream onto a carrier signal, using one of many possible modulation schemes, e.g., 8-vestigial sideband modulation (VSB), 16-VSB, Quadrature Amplitude Modulation (QAM) and the like.

As discussed above, the significant differences in the timing information embedded in the various transport streams pose a significant challenge in preserving audio/video lip sync when splicing transport streams from multiple sources. FIG. 1 illustrates a block diagram of a digital studio 100 that addresses this timing criticality by incorporating a lip sync evaluator 130.

More specifically, FIG. 1 illustrates the digital studio 100 incorporating a lip sync evaluator 130 that receives input transport streams from various program sources 112–116. Since the program sources may generate data streams with different formats, the digital studio 100 may employ the necessary devices to reformat or decode the various data streams into a common format prior to performing the splicing operation.

To illustrate, an optional encoding section 120 is employed to generate or convert various input signals into MPEG compliant elementary streams. For example, one or more of the input devices 116 may forward "raw" input signals such as analog video and audio signals from a camera to the studio 100 via path 101. The input signals are sampled and converted by an analog-to-digital (A/D) converter 122 into a digitized signal. The sampling frequency for the A/D is provided by the video/audio sampling clock 126, which, in turn, is frequency locked to the reference clock 150. The digitized signal is then encoded by video/audio encoder 124, to implement various video and audio compression methods, i.e., source encoding. The resulting transport stream is then ready to be forwarded to the lip sync evaluator 130 for evaluation before the transport stream is spliced into an output stream.

Similarly, an optional channel decoder 152 is employed to decode or convert various input signals into MPEG compliant transport streams. Since program sources may include broadcast/distribution networks 112, the data streams from such networks are typically channel encoded. Thus, the channel decoder 152 removes the channel coding prior to forwarding the transport streams to the lip sync evaluator.

Finally, the digital studio 100 may receive data streams that are already in the proper stream format from a server 114. In such case, the transport streams are read from the server using transport output clock 160 and are forwarded directly to the lip sync evaluator for evaluation.

Although the preferred embodiment of the present invention performs the splicing operation at the transport stream layer, the present invention can be adapted to splicing operations performed at other "stream layers", e.g., at the elementary stream layer. However, performing the splicing operation at lower stream layers may require more computational overhead, thereby incurring additional delay in the splicing operation.

Returning to FIG. 1, the input transport streams to be spliced are passed through a lip sync evaluator 130 that preserves the audio/video lip sync in the output transport stream. More specifically, the lip sync evaluator 130 determines the spacing between audio or video access units at the splice point. If the spacing indicates an overlap situation, then one of the overlapping audio or video access unit is deleted or dropped from the spliced output stream. The lip sync evaluator can be implemented using a processor 131 with an associated memory 132 or as a software implementation residing in a memory operated by a studio controller (not shown).

Furthermore, a portion of the memory 132 can be used as a buffer to temporally store relevant access units to determine whether an overlap condition exists. If an overlap condition is detected, then one of the overlapping access unit will be deleted from the memory without being inserted into the output transport stream as discussed below.

Figure 2:
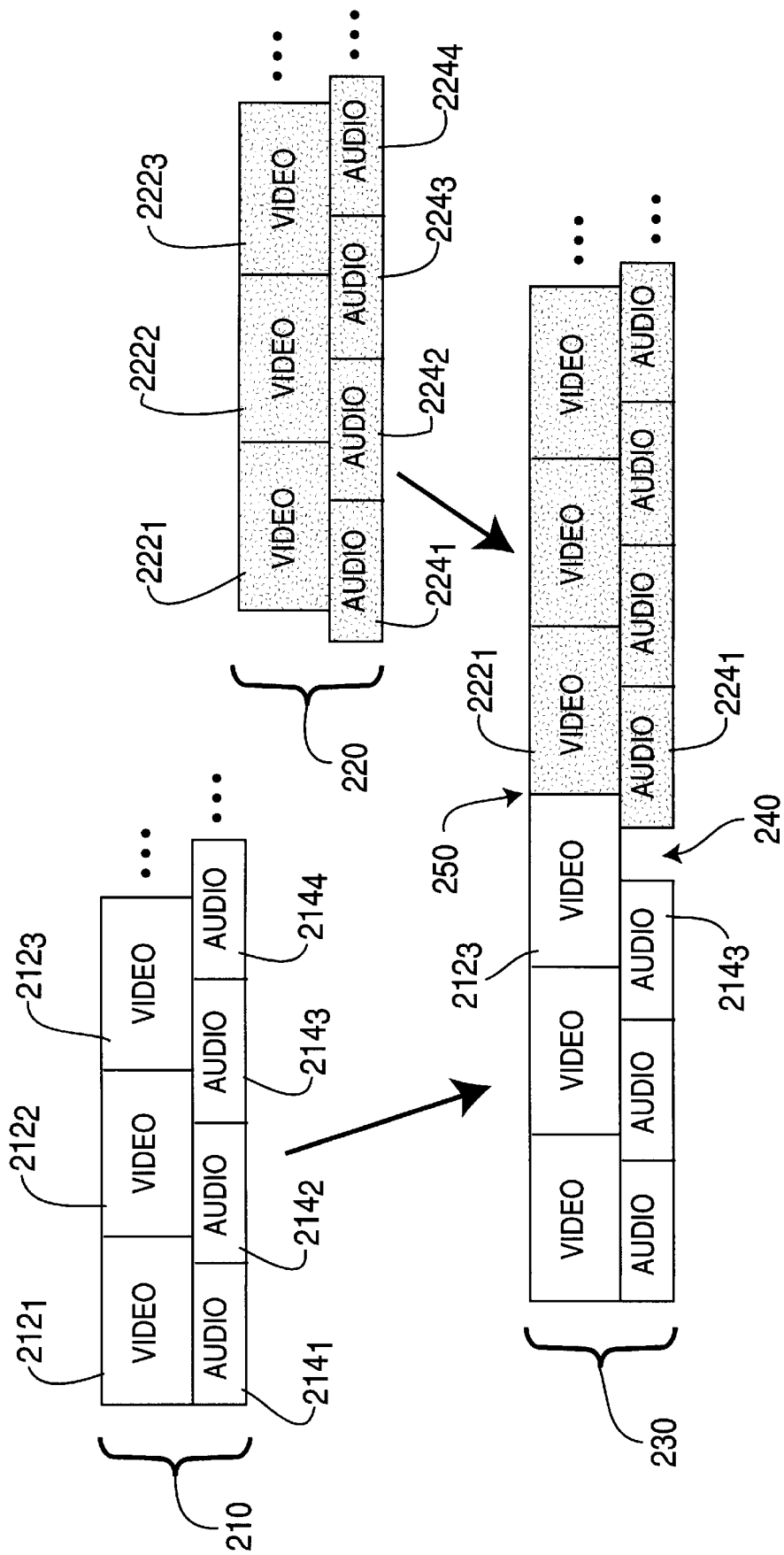
FIG. 2 illustrates a splicing operation that is premised on maintaining video presentation continuity.
Figure 3:
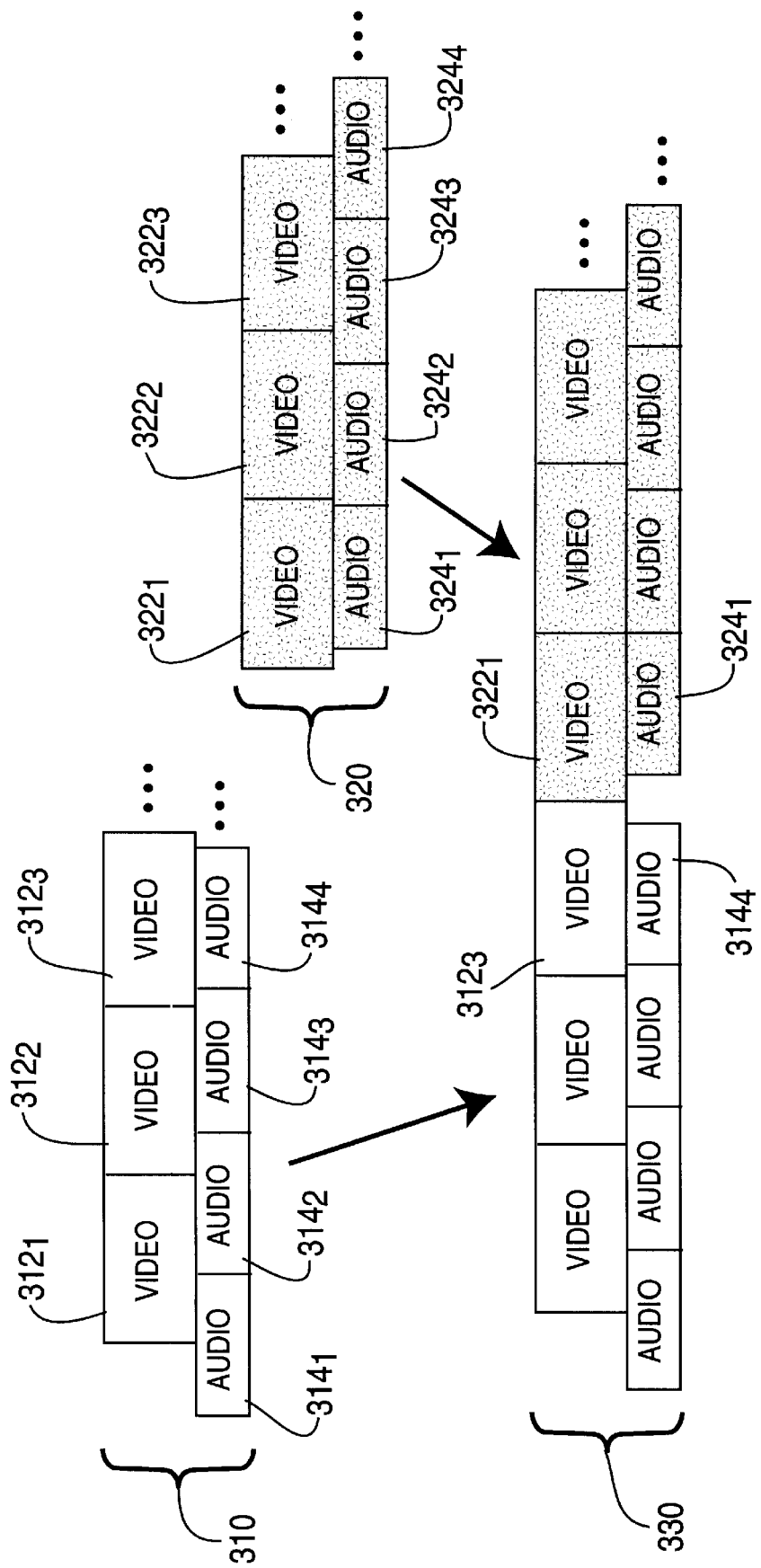
FIG. 3 illustrates a splicing operation that is premised on maintaining video presentation continuity, where an overlap condition does not exist.
Figure 4:
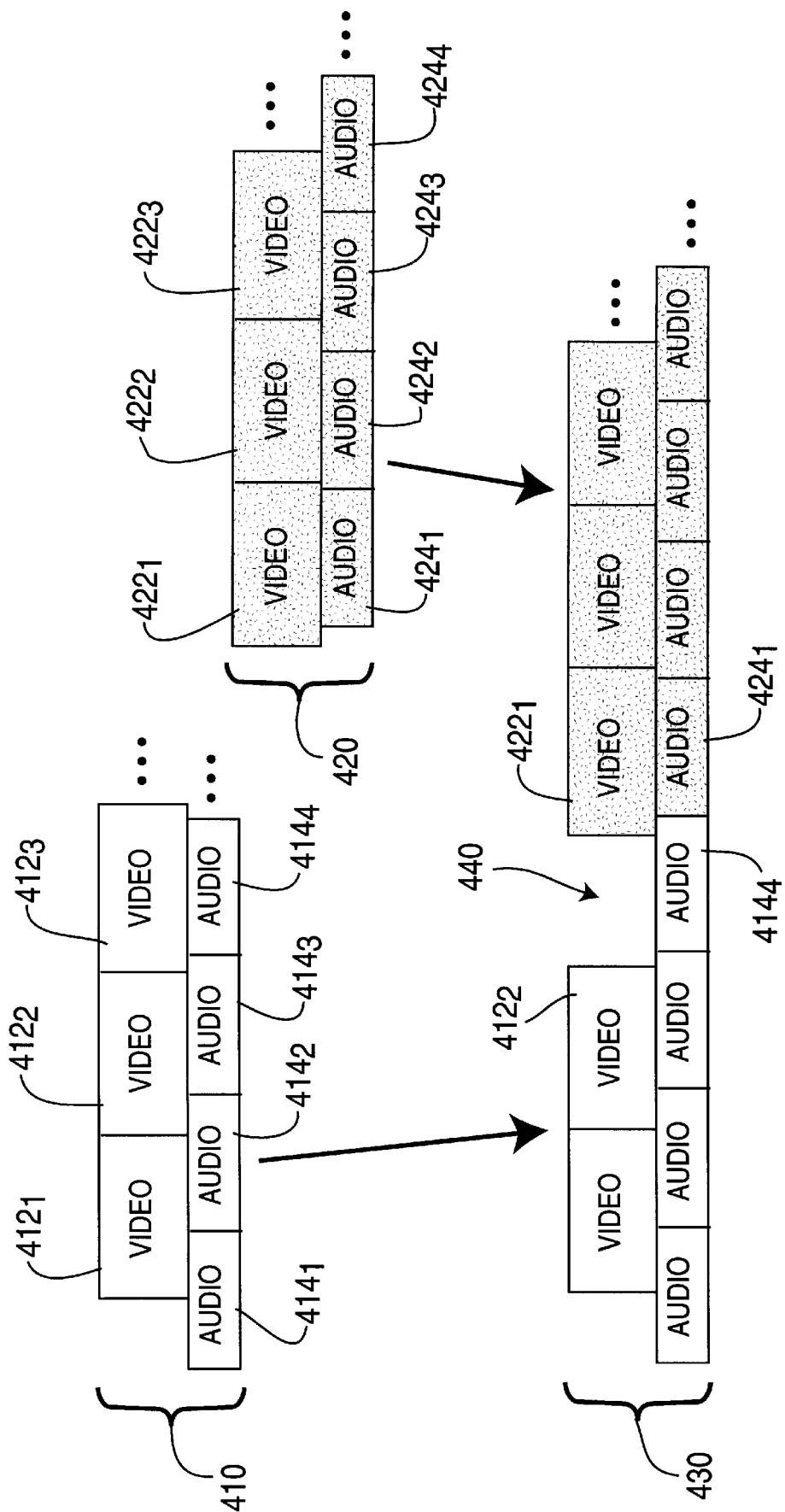
FIG. 4 illustrates an alternative embodiment of the present invention where the splicing operation is premised on maintaining audio presentation continuity.

Referring to FIGS. 2–4, each of these figures illustrates the timing relationship between the video access units and their associated audio access units for three different transport streams, i.e., a first input transport stream representative of a first program, a second input transport stream representative of a second program and the resulting output (spliced) transport stream. Again, since a transport stream is a serial stream of multiplexed audio and video packets, the "parallel" nature of the audio/video elementary streams (substreams) in each transport stream is only illustrative of the audio/video lip sync of each transport stream.

FIG. 2 illustrates the splicing operation of a first transport stream 210 with a second transport stream 220 to produce an output stream 230. More specifically, the first three (3) video access units $212_{1-3}$ and their associated four (4) audio access units $214_{1-4}$, are initially spliced from the first transport stream 210 to the output stream 230. Next, the first three (3) video access units $222_{1-3}$ and their associated four (4) audio access units $224_{1-4}$, are spliced from the second transport stream 220 to the output transport stream 230 behind those access units taken from the first transport stream 210. In FIG. 2, the splicing operation is premised on video frame alignment (picture presentation continuity), i.e., video access unit $222_1$ follows immediately after video access unit $212_3$.

To preserve the audio/video lip sync in the splicing operation, it is important to carefully analyze the timing relationship in the transport streams. An MPEG compliant transport stream comprises a plurality of packets with each packet having a length of 188 bytes, 4 bytes of header and 184 bytes of payload. The program clock reference (PCR) fields are carried in the adaptation field that follows the 4-byte transport packet header. The value encoded in the PCR field indicates the time t(i), where i refers to the byte containing the last bit of the PCR base field. The PCR values are derived from the 27 MHz reference clock 150 and are inserted into the transport stream to effect synchronization between the encoding and decoding process. More importantly, the PCR also serves as the basis for the generation of the presentation time stamp (PTS) and the decoding time stamp (DTS), that represent the presentation and decoding time of audio and video signals, respectively. These time stamps play an important role in audio/video lip sync.

The relationship between PCR and the PTS/DTS is generally defined for each transport stream at the time of creation of the stream. However, these timing information contain differences when compared to other PCR and PTS/DTS in other transport streams stored within server 114, or when compared to the timing of "real" time encoding of the encoding section 120 as illustrated in the digital studio. This timing discrepancy between multiple input transport streams must be addressed by the digital studio as the studio attempts to splice different transport streams into a single output transport stream. An example of a solution to address such timing discrepancy is disclosed in an accompanying patent application filed simultaneously herewith on May 28, 1997 with the title "Timing Correction Method and Apparatus" (attorney docket SAR 12389; Ser. No. 08/864,326), hereby incorporated by reference.

Returning to FIG. 2, each of the input transport streams 210 and 220 contains regularly spaced PTSs for both the audio and video access units. However, the PTSs for the video access units may or may not be time aligned with the PTSs from those of the associated audio access units. Furthermore, the video access units for the second transport stream 220, after the splice point 250, also contain regularly spaced PTSs but they are offset from those video access units of the first transport stream 210 by any amount within the range of possible values for PTSs. To maintain picture presentation continuity when the splicing operation is completed, the PTS for the first video access unit after the splice can be re-stamped with a value that would be expected after the end of the last video access unit before the splice operation. This process, as disclosed in accompanying application SAR 12389, maintains picture presentation continuity as long as a decoder buffer (not shown) is properly managed as recommended in the MPEG standards.

In brief, the presentation time for the video access unit following the splice point 250 can be calculated using the frame rate and the last PTS before the splice. A relationship between the calculated PTS and the original PTS stamped in the stream following the splice exists in the form of an offset. This offset can be applied to each PTS in the stream after the splice. The PTS for the audio access unit after the splice can be found by using the same offset that was used in the video stream. This process maintains the original synchronization between the video and the audio elementary streams both before and after the splice.

Returning to FIG. 2, in order to avoid the overlapping of audio access units $214_4$ and $224_1$ in the output transport stream 230, the audio access units $214_4$ is deleted from the output transport stream 230 during the splicing operation. The detection of the pending overlapping condition is performed by the lip sync evaluator 130. The method of detection can be summarized as follows:

$$\text{if } A1+B \leq A2\pm X, \text{ then no overlap condition} \quad (1)$$

$$\text{if } A1+B > A2\pm X, \text{ then overlap condition exists} \quad (2)$$

where A1 represents a time stamp, e.g., PTS, for the last audio access unit (e.g., audio access unit $214_4$) in the first transport stream. A2 represents a time stamp, e.g., PTS, for the first audio access unit (e.g., audio access unit $224_1$) in the second transport stream. B represents the duration of the last audio access unit, e.g., 32 msec. in accordance with the ATSC A/53 standard. X represents a general timing offset between the first transport stream 210 and the second transport stream 220, where X can be determined as disclosed above in the accompanying application, with attorney docket SAR 12389.

The offset X can be calculated by an audio/video PTS/DTS retiming section 137 as illustrated in FIG. 1, where the calculated offset X is passed to the lip sync evaluator 130 for use as discussed above. However, if the two input transport streams are already time synchronized, e.g., previously adjusted within the server 114 or the two transport streams were originally created with the same timebase, then the offset X should be zero.

To illustrate, FIG. 2 depicts the deletion of the audio access unit $214_4$ from the output transport stream 230. As shown pictorially, audio access unit $214_4$ will overlap with audio access unit $224_1$ in the output transport stream. More specifically, the PTS of the audio access unit $214_4$ is illustrated as having a value that is trailing the PTS of the video access unit $212_3$. Namely, the video signal contained within the video access unit $212_3$ will be displayed ahead in time before the presentation of the audio signal contained within the audio access unit $214_4$. This creates the effect where the duration of the audio signal contained within the audio access unit $214_4$ overlaps with the start of presentation of the audio signal contained within the audio access unit $224_1$. If this condition is detected, the present invention deletes the audio access unit $214_4$ prior to the splicing operation, thereby leaving a gap 240 in the audio elementary stream. Such gaps in audio signal are typically handled by the audio decoder (not shown) by gracefully muting the audio output or adjusting the volume of the audio output.

Although the preferred embodiment deletes the last audio access unit $214_4$, it should be understood that the overlapping condition can be resolved by deleting the first audio access unit $224_1$ from the second transport stream 220. The judgment as to which audio access unit to delete is an artistic decision. In certain applications, it may be desirable to always present the newly spliced video access units with their associated audio access units, while other applications may prefer the presentation of the audio signal from the previous transport stream to be completed.

FIG. 3 illustrates a splicing operation where there is no overlap of audio access units. More specifically, FIG. 3 illustrates a splicing operation of a first transport stream 310 with a second transport stream 320 to produce an output stream 330. The first three (3) video access units $312_{1-3}$ and their associated four (4) audio access units $314_{1-4}$, are initially spliced from the first transport stream 310 to the output stream 330. Next, the first three (3) video access units $322_{1-3}$ and their associated four (4) audio access units $324_{1-4}$, are spliced from the second transport stream 320 to the output transport stream 330, behind those access units taken from the first transport stream 310.

Similarly, the splicing operation in FIG. 3 is also premised on maintaining picture presentation continuity, i.e., video access unit $322_1$ follows immediately after video access unit $312_3$. However, unlike the splicing operation illustrated in FIG. 2, audio access unit $314_4$ does not overlap audio access unit $324_1$. Absence an overlap condition, the second transport stream is simply spliced into the output transport stream without the need to delete any audio access unit.

FIG. 4 illustrates an alternative embodiment of the present invention where the splicing operation is premised on maintaining audio presentation continuity. More specifically, FIG. 4 illustrates a splicing operation of a first transport stream 410 with a second transport stream 420 to produce an output stream 430. The first three (3) video access units $412_{1-3}$ and their associated four (4) audio access units $414_{1-4}$, are initially spliced from the first transport stream 410 to the output stream 430. Next, the first three (3) video access units $422_{1-3}$ and their associated four (4) audio access units $424_{1-4}$, are spliced from the second transport stream 420 to the output transport stream 430, behind those access units taken from the first transport stream 410.

However, unlike FIGS. 2–3, the splicing operation is premised on maintaining audio presentation continuity, i.e., audio access unit $424_1$ follows immediately after audio access unit $414_4$. This creates a potential overlap of video access units, e.g., video access unit $412_3$ will overlap with video access unit $422_1$ in the output transport stream. If this condition is detected, the present invention deletes the video access unit $412_3$ prior to the splicing operation, thereby leaving a gap 440 in the video elementary stream. Such gaps in the video signal maybe handled by future video decoder (not shown) by gracefully changing the frame or field rate at the discontinuity. Again, artistic decision may decide which video access unit to delete.

Furthermore, the above equations (1) and (2) can be similarly applied where the splicing operation is premised on maintaining audio presentation continuity. More specifically, A1 represents a time stamp for said last video access unit of the first transport stream. A2 represents a time stamp for said first video access unit of the second transport stream. B represents a duration of said last video access unit of the first transport stream, and X represents a timing offset between said first transport stream and said second transport stream.

Figure 5:
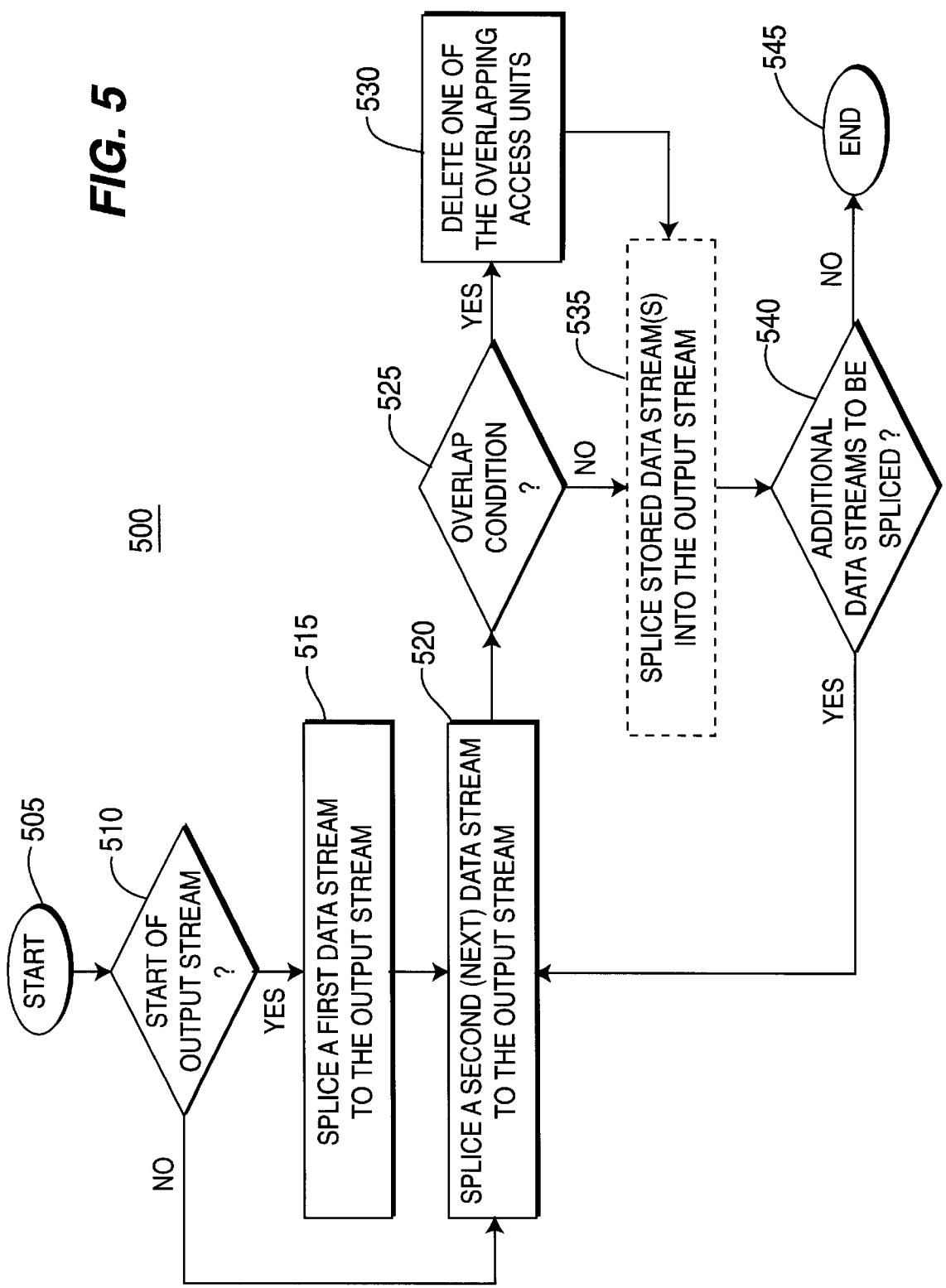
FIG. 5 illustrates a flowchart of a method for preserving audio/video lip sync when splicing a plurality of data streams into an output stream.

FIG. 5 illustrates a flowchart of a method 500 for preserving audio/video lip sync when splicing a plurality of data streams into an output stream. Referring to FIG. 5, the method 500 starts at step 505 and proceeds to step 510, where method 500 determines whether the current splicing operation is the start of a new output stream or whether a data stream is spliced into an existing output stream. If the query is negatively answered, method 500 proceeds to step 520. If the query at step 510 is affirmatively answered, method 500 proceeds to step 515 where a first data stream (or portion thereof) is selected (spliced) to be the start of a new output stream.

In step 515, a first data stream, e.g., a first transport stream (or portion thereof), is spliced to form the beginning of an output stream. In the preferred embodiment, the selected data stream passes through (temporally stored within) a buffer, e.g., within memory 132, before being forwarded to the service multiplexer 135. Generally, the buffer is implemented as a First-In-First Out (FIFO) buffer. This buffering of the selected data streams creates a time window, where the lip sync evaluator 130 is allowed to detect for overlapping of access units as described below.

It should be understood that the selected data streams can be stored in a buffer for analysis prior to being spliced into the output stream for certain applications. However, storing such data streams requires large buffer size and may not be well suited for real time applications. Furthermore, since an overlapping condition generally occurs at the splice point, method 500 generally only needs to analyze the various access units that are proximate to the splice point.

In step 520, a second data stream, e.g., a second transport stream (or portion thereof), is selected and spliced at a splice point behind the first selected data stream to continue the formation of the output stream. Similarly, the second selected data stream also passes through a buffer, e.g., within memory 132, before being forwarded to the service multiplexer 135 as illustrated in FIG. 1.

In step 525, method 500 determines whether an overlapping condition exists at the splice point with regard to audio or video access units. If the query is negatively answered, method 500 proceeds to optional step 535. If the query at step 525 is affirmatively answered, method 500 proceeds to step 530 where one of the overlapping access unit is deleted to resolve the overlapping condition.

The deletion step 530 can be implemented within the buffer 132 or the selected overlapping access unit can be simply dropped without being forwarded to the service multiplexer 135. Furthermore, the decision whether to delete an audio or a video access unit is premised on the alignment scheme selected for an application as discussed above.

In optional step 535, if the selected data streams are stored and analyzed in their entirety before the actual splice operation, then the selected data streams are spliced together in this step. Otherwise, this step can be omitted if the data streams are spliced and analyzed "on the fly" as discussed above.

In step 540, method 500 determines whether additional data streams are scheduled to be spliced into the output stream. If the query at step 540 is affirmatively answered, method 500 proceeds to step 520, where the next data stream is selected and spliced into the output stream. If the query is negatively answered, method 500 ends in step 545.

There has thus been shown and described a novel method and apparatus for preserving audio/video lip sync when splicing data streams. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A method for preserving lip sync during a splicing operation where a plurality of data streams is multiplexed into an output stream, where each of the data streams contains an audio stream having a plurality of audio access units and a video stream having a plurality of video access units that are in lip sync, said method comprising the steps of:
   (a) splicing a portion of a first data stream into the output stream;
   (b) splicing a portion of a second data stream into the output stream;
   (c) determining at a splice point whether an overlap condition exists between a last audio access unit from said first data stream and a first audio access unit from said second data stream; and
   (d) deleting either said last audio access unit or said first audio access unit if an overlap condition exists.

2. The method of claim 1, wherein said data streams are transport streams.

3. The method of claim 1, wherein said determining step (c) determines said overlap condition in accordance with:

$$\text{if } A1+B \leq A2 \pm X, \text{ then no overlap condition}$$

$$\text{if } A1+B > A2 \pm X, \text{ then overlap condition exists}$$

where A1 represents a time stamp for said last audio access unit, A2 represents a time stamp for said first audio access unit, B represents a duration of said last audio access unit, and X represents a timing offset between said first data stream and said second data stream.

4. The method of claim 1, further comprises the step of:
   (b') storing said portions of said first and second data streams in a buffer.

5. The method of claim 1, wherein said splicing step (b) is premised on maintaining picture presentation continuity.

6. A method for preserving lip sync during a splicing operation where a plurality of data streams is multiplexed into an output stream, where each of the data streams contains an audio stream having a plurality of audio access units and a video stream having a plurality of video access units that are in lip sync, said method comprising the steps of:
   (a) splicing a portion of a first data stream into the output stream;
   (b) splicing a portion of a second data stream into the output stream;
   (c) determining at a splice point whether an overlap condition exists between a last video access unit from said first data stream and a first video access unit from said second data stream; and
   (d) deleting either said last video access unit or said first video access unit if an overlap condition exists.

7. The method of claim 6, wherein said data streams are transport streams.

8. The method of claim 6, wherein said determining step (c) determines said overlap condition in accordance with:

$$\text{if } A1+B \leq A2 \pm X, \text{ then no overlap condition}$$

$$\text{if } A1+B > A2 \pm X, \text{ then overlap condition exists}$$

where A1 represents a time stamp for said last video access unit, A2 represents a time stamp for said first video access unit, B represents a duration of said last video access unit, and X represents a timing offset between said first data stream and said second data stream.

9. The method of claim 6, further comprises the step of:
   (b') storing said portions of said first and second data streams in a buffer.

10. The method of claim 6, wherein said splicing step (b) is premised on maintaining audio presentation continuity.

11. An apparatus for preserving lip sync during a splicing operation where a plurality of data streams is multiplexed into an output stream, where each of the data streams contains a first substream having a plurality of access units and a second substream having a plurality of access units, said apparatus comprising:
   a splicer for splicing a portion of a first data stream and a portion of a second data stream into the output stream;
   a means, coupled to said splicer, for determining at a splice point whether an overlap condition exists between said access units from said first data stream and said second data stream; and
   a means, coupled to said determining means, for deleting one or more of said access units if an overlap condition exists.

12. The apparatus of claim 11, wherein said first substream is an audio stream having a plurality of audio access units and said second substream is a video stream having a plurality of video access units that are in lip sync to said audio access units.

13. The apparatus of claim 12, wherein said deleted access unit is an overlapping audio access unit.

14. The apparatus of claim 12, wherein said deleted access unit is an overlapping video access unit.

15. The apparatus of claim 13, wherein said overlap condition is determined in accordance with:

$$\text{if } A1+B \leq A2 \pm X, \text{ then no overlap condition}$$

$$\text{if } A1+B > A2 \pm X, \text{ then overlap condition exists}$$

where A1 represents a time stamp for a last audio access unit of said first data stream, A2 represents a time stamp for a first audio access unit of said second data stream, B represents a duration of said last audio access unit, and X represents a timing offset between said first data stream and said second data stream.

16. The apparatus of claim 14, wherein said overlap condition is determined in accordance with:

if $A1+B \leq A2 \pm X$, then no overlap condition if $A1+B > A2 \pm X$, then overlap condition exists where A1 represents a time stamp for a last video access unit of said first data stream, A2 represents a time stamp for a first video access unit of said second data stream, B represents a duration of said last video access unit, and X represents a timing offset between said first data stream and said second data stream.

17. The apparatus of claim 11, wherein said determining means further comprises:

a buffer for storing said portions of said first and second data streams.

18. The apparatus of claim 11, wherein said splicer operates in accordance with maintaining picture presentation continuity.

19. The apparatus of claim 11, wherein said splicer operates in accordance with maintaining audio presentation continuity.

* * * * *